United States Patent Office 3,652,648
Patented Mar. 28, 1972

3,652,648
PRODUCTION OF 4,5-BENZTROPONE-2,7-DICARBOXYLIC ESTERS
Baldur Foehlisch, Stuttgart, Germany, assignor to Badische Anilin- & Soda-Fabric Aktiengesellschaft, Ludwigshafen (Rhine), Germany
No Drawing. Filed Apr. 15, 1970, Ser. No. 28,957
Claims priority, application Germany, Apr. 21, 1969, P 19 20 081.8
Int. Cl. C07c 69/76
U.S. Cl. 260—475 FR
7 Claims

ABSTRACT OF THE DISCLOSURE

Production of benztropone dicarboxylic esters by condensation of o-phthalaldehydes with acetone dicarboxylic esters in an acid medium.

---

The invention relates to a process for the production of benztropones.

It is known from Liebigs "Annalen der Chemie," 369 287 (1909) that tropone dicarboxylic esters can be obtained by alkaline condensation of o-phthalaldehyde with acetone dicarboxylic esters. According to this literature reference, tropone dicarboxylic acid is obtained with sulfuric acid. The yields in this process are about 50% of the theory.

There has therefore been a need for a reaction which will give higher yields. Moreover a method has been sought after which will give the desired products in a single vessel reaction using easily obtainable starting materials.

We have found that benztropone dicarboxylic esters having the general Formula 1:

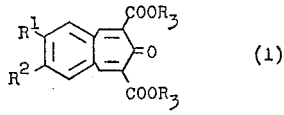

where $R^1$ and $R^2$ may be identical or different and each denotes a hydrogen atom, an alkyl group having one to five carbon atoms, a chlorine atom or a bromine atom and in which $R^3$ denotes a linear alkyl group having one to six carbon atoms can be prepared by condensation or aromatic o-dialdehydes with acetone dicarboxylic esters readily and in good yields by reacting an aromatic o-dialdehyde having the general Formula 2:

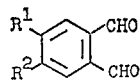

where $R^1$ and $R^2$ are as defined in Formula 1 with an acetone dicarboxylic ester having the general Formula 3:

$$\begin{array}{c} CH_2-COOR^3 \\ | \\ C=O \\ | \\ CH_2-COOR^3 \end{array} \quad (3)$$

where $R^3$ is as defined in Formula 1, in the presence of a concentrated mineral acid.

We have further found that the said end products can also be obtained by reacting with an acetone dicarboxylic acid an acid reaction solution which contains the starting product having the Formula 2 and which has been obtained by treatment of an $\omega,\omega'$-tetrahaloxylene having the general Formula 4:

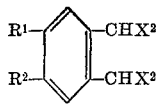

where $R^1$ and $R^2$ are as defined in Formula 1 and X denotes a chlorine atom or bromine atom, with oleum containing from 10 to 40% by weight of free sulfur trioxide.

The following phthalaldehydes are preferred as starting materials having the Formula 2: o-phthalaldehyde, 5,6-dimethyl-2,3-phthalaldehyde, 5,6 - dichloro-2,3-phthalaldehyde and 5,6-dibromo-2,3-phthalaldehyde. The use of phthalaldehyde is of particular industrial interest.

Acetone dicarboxylic esters having the Formula 3 are those whose alcohol radical contains one to six carbon atoms, the alcohol radicals being straight chain. Examples are the methyl, ethyl, n-propyl, n-butyl, n-pentyl and n-hexyl esters, the ethyl and methyl esters being particularly favorable.

The $\omega,\omega'$-tetrahalo-ortho-xylenes having the Formula 4 which are used according to the said variant of the reaction are preferably unsubstituted $\omega,\omega'$-o-tetrahaloxylenes or their 4,5-dimethyl, dichloro or dibromo derivatives. The radicals X attached to the side chains denote chlorine or bromine. The $\omega,\omega'$-tetrachloroxylenes and $\omega,\omega'$-tetrabromoxylenes required for the variant according to the invention are also suitable as starting materials.

Concentrated mineral acids such as sulfuric acid or phosphoric acid, e.g. at least 90% sulfuric acid, are used according to the invention as condensing agents. It is preferred to use 96 to 98% sulfuric acid as the concentrated mineral acid.

Only sulfuric acid is suitable for the variant of the reaction in which the starting product is prepared from the $\omega,\omega'$-tetrahaloxylene and then further processed because hydrolysis of the $\omega,\omega'$-tetrahaloxylenes is carried out with 10 to 40% oleum. After hydrolysis and dilution of the solution, sulfuric acid is therefore already available for the condensation reaction according to the invention.

The process may for example be carried out as follows:

Advantageously the phthalaldehyde is dissolved in an about 3-molar excess of concentrated mineral acid at —20° C. to +10° C., preferably at —5° C. to +5° C., and a molar proportion of acetone dicarboxylic ester is slowly added while maintaining the said temperature conditions. An excess of up to 5% of acetone dicarboxylic ester may however be used so that an increase in yield is achieved. The temperature is then raised to 18° to 25° C. and the system is stirred for thirty minutes to two hours, preferably for about one hour.

Isolation of the reaction product is carried out by dilution with ice-water, preferably by pouring the reaction solution onto ice. The product which has precipitated and has been washed neutral may be purified by recrystallization in a conventional way.

In an advantageous variant of the process according to the invention one to two equivalents of the $\omega,\omega'$-tetrahaloxylene is stirred with twice to three times the molar amount of oleum containing 10 to 40%, preferably 10 to 30%, by weight of free sulfur trioxide dissolved therein for three to four hours at —10° C. to +5° C., preferably at about 0° C. until a clear solution has been formed. Then such an amount of sulfuric acid and water is added that all excess sulfur trioxide is combined and a concentrated sulfuric acid solution is obtained preferably having 96 to 98% of pure sulfuric acid. About 2 to 4, preferably about 3, molar equivalents of sulfuric acid and 3 to 5, preferably about 4, molar equivalents of water are added with stirring at a temperature of from —10° C. to +5° C., preferably at about 0° C. This portion of the reaction is advantageously carried out under an inert gas such as argon, nitrogen or carbon dioxide.

Disengaged gas, such as hydrogen chloride, hydrogen bromide and some free bromine, may be expelled advantageously with inert gas such as argon, nitrogen or carbon dioxide. If bromine vapor occurs, this has to be expelled.

The whole is then cooled to −5° C. to 0° C. and 1 to 2 molar equivalents of the acetone dicarboxylic ester is added as described above and the whole worked up appropriately.

The new process provides the possibility of preparing products of the benztropone series easily and in good yields. Benztropones are of great importance in respect of their use as intermediates for pharmaceuticals.

The variant of the process according to the invention demonstrates the surprising fact that it is possible in a single reactor without isolation of the starting compound to pass from o-tetrahaloxylenes direct to the tropone ester without it being necessary to purify and isolate the o-phthalaldehyde according to the directions given in Houben-Weyl 7, 1, 1954, pages 217 et seq. in a time-consuming manner. It is surprising that the acid condensation results in the ester stage and not the free acid stage which would have immediately reacted further as a customary representative of a ketoacid.

The following examples illustrate the invention. The parts specified in the following examples are parts by weight unless otherwise specified.

EXAMPLE 1

6.72 parts of o-phthalaldehyde is dissolved in 160 parts by volume of concentrated sulfuric acid which has been cooled to 0° C. and and then while cooling at 0° C. 8.72 parts of the dimethyl ester of acetone dicarboxylic acid is dripped in. The whole is stirred for another hour at room temperature and poured onto ice and the precipitate is suction filtered and washed with water until free from acid. The dried powder is recrystallized from methanol or methyl ethyl ketone. 9.9 parts (73%) of 4,5-benztropone-2,7-dicarboxylic dimethyl ester is obtained having a melting point of 183° to 185° C.

EXAMPLE 2

10.2 parts (68%) of 4,5-benztropone-2,7-dicarboxylic diethyl ester having a melting point of 93° to 95° C. is obtained analogously to Example 1 from 6.72 parts of o-phthalaldehyde and 10.11 parts of the diethyl ester of acetone dicarboxylic acid and 160 parts by volume of concentrated sulfuric acid.

EXAMPLE 3

105 parts of $\alpha,\alpha,\alpha',\alpha'$-tetrabromo-o-oxylene is stirred with 300 parts by volume of 30% oleum which has been cooled to 0° C. until a clear solution has been formed (three to four hours) while maintaining the said temperature. While passing nitrogen through, a mixture of 200 parts by volume of 97% sulfuric acid and 60 parts by volume of water is dripped in, the temperature being kept below +5 C. by cooling. When all has been dripped in, bromine vapors formed are completely expelled at 20° C. by means of nitrogen. The mixture is then cooled again to 0° C. to −5° C. and 43.6 parts of the dimethyl ester of acetone dicarboxylic acid is dripped in while stirring. Stirring is continued for another hour at 25° C. The whole is poured onto ice and the precipitate is suction filtered and washed with water until free from acid. After drying and recrystallizing the product from methyl ethyl ketone, 42.7 parts (62%) of the dimethyl ester of 4,5-benztropone dicarboxylic acid having a melting point of 183° to 185° C. is obtained.

EXAMPLE 4

25.1 parts (70%) of 4,5-benztropone-2,7-dicarboxylic diethyl ester is obtained analogously to Example 3 by dissolving $\alpha,\alpha,\alpha',\alpha'$-tetrabromo-o-xylene in 150 parts of 30% oleum while cooling, diluting with 100 parts by volume of concentrated sulfuric acid and 30 parts by volume of water and adding 25 g. of the diethyl ester of acetone dicarboxylic acid. The product is recrystallized from ethanol. The melting point is from 93° to 95° C.

EXAMPLE 5

105 parts of $\alpha,\alpha,\alpha',\alpha'$-tetrabromo-o-xylene is stirred with 300 parts by volume of 18% oleum (which has been cooled to 0° C.) at 0° C. until a clear solution has been formed. This requires about fifteen hours. While passing nitrogen through, a mixture of 100 parts by volume of 97% sulfuric acid and 34 parts by volume of water is dripped in, the temperature being kept below 0° C. by cooling. When all has been dripped in, the bromine vapor which develops is expelled in a stream of nitrogen at about 20° C. The mixture is cooled again to 0° C. to −5° C. and 43.6 parts of the dimethyl ester of acetone dicarboxylic acid is dripped in while stirring. Stirring is continued for another hour at room temperature. The whole is poured onto ice, washed with water until free from acid, dried and recrystallized from methyl ethyl ketone. The yield is 44.2 parts (64%) of the dimethyl ester of 4,5-benztropone-2,7-dicarboxylic dimethyl ester having a melting point of 182° to 184° C.

EXAMPLE 6

28.7 parts of $\alpha,\alpha,\alpha',\alpha'$-tetrachloro-o-oxylene is stirred with 150 parts by volume of 30% oleum at 0° C. until a clear solution has been formed; this requires about twenty hours. Then a mixture of 100 parts by volume of concentrated sulfuric acid and 30 parts by volume of water is dripped in, the temperature being kept at below 0° C. Halogen chloride is expelled by passing nitrogen through at the same time. The mixture is then cooled to 0° to −5° C. and 25 parts of the dimethyl ester of acetone dicarboxylic acid is dripped in while stirring. The whole is then stirred for one hour at room temperature, poured onto ice and the product isolated as described in Example 3. The yield is 23.8 parts (74%) of the dimethyl ester of 4,5-benztropone-2,7-dicarboxylic acid having a melting point of 182° to 184° C.

I claim:

1. A process for the production of esters of 4,5-benztropone-2,7-dicarboxylic acid having the Formula 1:

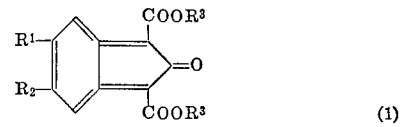

(1)

where $R^1$ and $R^2$ denote identical or different substituents selected from the group consisting of hydrogen atoms, alkyl groups having one to five carbon atoms, chlorine atoms and bromine atoms and $R^3$ denotes a straight chain alkyl group having one to six carbon atoms wherein an aromatic dialdehyde having the Formula 2:

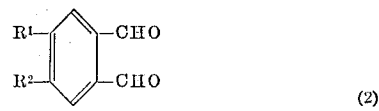

(2)

where $R^1$ and $R^2$ have the above meaning is contacted with an ester of acetone dicarboxylic acid having the Formula 3:

(3)

where $R^3$ has the above meaning, said contacting taking place in a concentrated mineral acid.

2. A process as claimed in claim 1 in which $R^1$ and $R^2$ are hydrogen atoms and $R^3$ is a methyl or ethyl group, comprising contacting phthalaldehyde with the methyl or ethyl ester of acetone dicarboxylic acid.

3. A process as claimed in claim 1 carried out in sulfuric acid containing 96 to 98% of pure sulfuric acid.

4. A process for the production of 4,5-benztropone-2,7-dicarboxylic esters having the Formula 1:

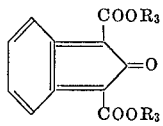

where $R^1$ and $R^2$ denote the same or different substituents selected from the group consisting of hydrogen atoms, alkyl groups having one to five carbon atoms, chlorine atoms and bromine atoms, and $R^3$ denotes a straight chain alkyl group having one to six carbon atoms, which consists in (a) treating an $\omega,\omega'$-tetrahalo-o-xylene having the Formula 4:

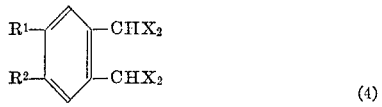

where $R^1$ and $R^2$ have the meanings given above and X denotes a chlorine atom or bromine atom, with oleum containing from 10 to 40% by weight of free sulfur trioxide and (b) contacting the acid solution containing the aromatic dialdehyde prepared in step (a) with an ester of acetone dicarboxylic acid having the Formula 3:

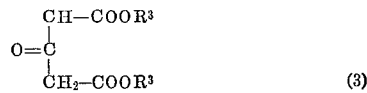

where $R^3$ has the meanings given above, said contacting taking place in concentrated sulfuric acid.

5. A process as claimed in claim 4 carried out in one reactor.

6. A process as claimed in claim 4 in which the $\omega,\omega'$-tetrachloro-o-xylene or $\omega,\omega'$-tetrabromo-o-xylene is treated with oleum and the reaction solution is contacted with the methyl or ethyl ester of acetone dicarboxylic acid.

7. A process as claimed in claim 4 in which step (b) is carried out in concentrated sulfuric acid contacting from 96 to 98% of pure sulfuric acid.

References Cited

Tetrahedron, 1968, 24(12) pp. 4501–8 (1968).

LORRAINE A. WEINBERGER, Primary Examiner

E. J. SKELLY, Assistant Examiner

UNITED STATES PATENT OFFICE
CERTIFICATE OF CORRECTION

Patent No. 3,652,648        Dated March 28, 1972

Inventor(s) Baldur Foehlisch

It is certified that error appears in the above-identified patent and that said Letters Patent are hereby corrected as shown below:

Column 1, line 5, "Fabric" should read -- Fabrik --; lines 37 and 40, those portions of the formula reading "R3" should read -- $R^3$ --; line 45, "or" should read --- of --.

Column 4, lines 40 to 45, " 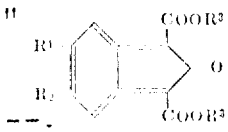 " should read

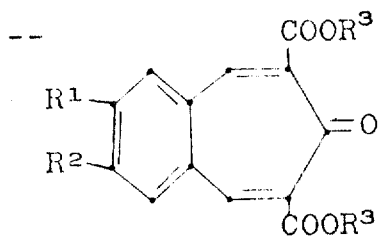

Column 5, lines 3 to 7, " 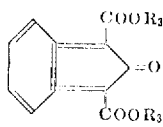 " should read

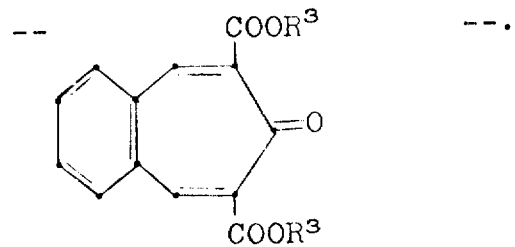

--.

Signed and sealed this 21st day of November 1972.

(SEAL)
Attest:

EDWARD M. FLETCHER, JR.
Attesting Officer

ROBERT GOTTSCHALK
Commissioner of Patents